Dec. 13, 1927.  
W. E. BEST  
TIRE CARRIER  
Filed June 4, 1926  
1,652,296
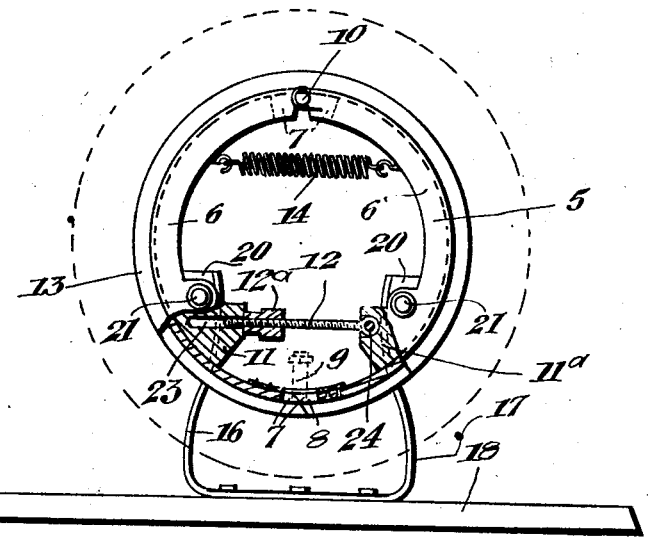
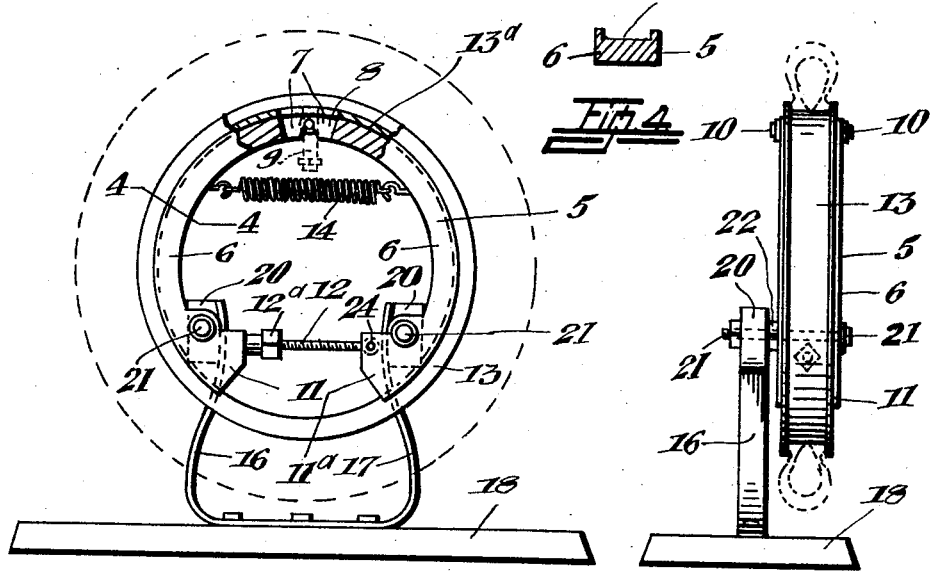
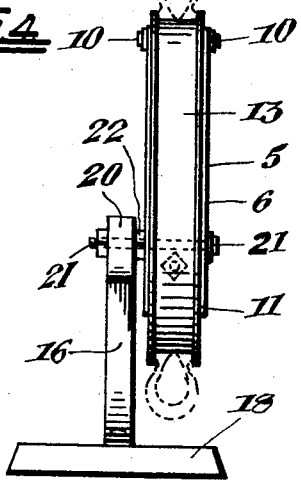
INVENTOR.
WILBUR. E. BEST.
BY
ATT'YS.

Patented Dec. 13, 1927.

1,652,296

UNITED STATES PATENT OFFICE.

WILBUR ELLIOTT BEST, OF SMITHS FALLS, ONTARIO, CANADA.

TIRE CARRIER.

Application filed June 4, 1926, Serial No. 113,747, and in Canada June 10, 1925.

This invention relates to improvements in tire carriers especially adapted for application to motor vehicles and the objects of the invention are to provide a tire carrier adapted to hold a tire securely and having novel means whereby the same may be employed for expanding a tire rim after the tire has been placed thereon and means for securing the tire rim to the holder whereby the loss of the tire is positively prevented.

A further object is to provide a tire carrier of neat appearance, durable and efficient construction and which can be manufactured and placed on the market at low price.

Heretofore a great deal of difficulty was experienced in spreading or expanding a tire rim and locking it in position with the tire thereon. Even under ideal conditions, and frequently in inconvenient and out-of-the-way places, a stubborn tire and rim will take from one to two hours to assemble. With my improved device, however, it will be possible to make a complete change of tire and rim in a matter of minutes.

Other objects and advantages of the invention will be apparent during the course of the following description in which, it will be noted, the invention consists essentially in the combination with the tire rim and a pair of semi-circular sections, adjustably spaced at one point from one another by means of an adjusting screw, of a pair of supporting spring members having means thereof adapted to engage with retaining means carried by said sections whereby pressure is automatically and continuously exerted to contract the two sections.

Referring now to the drawings in which like characters of reference indicate corresponding parts in each figure, Figure 1 is a side elevation of my improved tire carrier used as a rim spreader, the rim with tire thereon being in spread position.

Figure 2 is a side elevation of my improved tire carrier, used as such, and showing the tire and rim in position.

Figure 3 is an end view of the tire carrier, and

Figure 4 is a section on the line 4—4 of Figure 2.

In the drawings wherein, for the purpose of illustration, is shown a preferred embodiment of my invention, the body of which is in the form of an annulus comprising a pair of semi-circular sections 6 formed with slots 7 in one end thereof adapted to form an opening 8 to receive a tire valve 9. These slotted ends of the sections 6 are pivotally connected together at 10 while the other ends of the sections 6 are formed with enlarged portions 11 and 11$^a$ and are adapted to be arranged in spaced relationship to one another and connected to one another by means of an adjusting screw 12 with nut 12$^a$ thereon adapted, when operated, to draw the sections 6, hingedly mounted at 10, together and move them apart or, in other words, in combination with the tire rim 13 to expand the latter.

As illustrated particularly in Figure 4 the sections 6 are provided with an external groove 13$^a$ which will prevent the rim from slipping or otherwise becoming disengaged.

For automatically exerting pressure on these sections to draw them together I provide a coil spring 14 adjacent the top connecting them and resilient supporting means in the form of a pair of spaced steel spring supporting members 16 and 17 suitably bent or sprung and rigidly secured at their lower end to a plate 18, the upper ends being provided with rigidly mounted block members 20 adapted to engage with securing screws 21 carried by the enlarged portions 11 and 11$^a$ of the sections. As will be noted, in Figure 3 the washers 22 are adapted to be positioned on the screws 21 between the members 6 and 20 respectively, the clearance thus created, combined with the steel spring supports 16 and 17, allowing perfect freedom of action to the sections 6 when the adjusting screw 12 is operated to expand or to release the tire rim.

Reference being now had to Figure 1 it will be observed that the member 11 is provided with a slot 23 which houses the loose end of the adjusting screw 12, the other end of the screw 12 being pivotally mounted at 24 in the member 11$^a$.

Further, as regards the operation, the sections 6 are secured in firm engagement with the rim 13 of the tire so as to hold the tire firmly in position. When it is desired to remove the tire from the rim it is merely necessary to operate the member 12$^a$ to permit said sections to automatically contract. The tire may then be removed.

As many changes could be made in the above construction and many apparently widely different embodiments of my invention, within the scope of the claim, constructed without departing from the spirit or scope thereof, it is intended that all matter contained in the accompanying specification and drawings shall be interpreted in an illustrative and not in a limiting sense.

What I claim as my invention is:

In a tire carrier and in combination, a pair of hingedly connected semi-circular sections formed with slots in the hinged ends and provided with longitudinally extending grooves, a frame, a substantially U-shaped member of resilient metal, with curved sides, rigidly mounted on said frame and rigidly connected at each side to the semi-circular sections whereby said sections are automatically contracted, enlarged portions integral with said sections and an adjusting screw connecting the sections whereby on the screw being operated the sections are expanded.

In witness whereof I have hereunto set my hand.

WILBUR ELLIOTT BEST.